(12) United States Patent
Zhang et al.

(10) Patent No.: US 12,417,358 B2
(45) Date of Patent: Sep. 16, 2025

(54) LANGUAGE REPRESENTATION MODEL SYSTEM, PRE-TRAINING METHOD AND APPARATUS, DEVICE, AND MEDIUM

(71) Applicant: Beijing Bytedance Network Technology Co., Ltd., Beijing (CN)

(72) Inventors: Xinsong Zhang, Beijing (CN); Pengshuai Li, Beijing (CN); Hang Li, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 468 days.

(21) Appl. No.: 17/923,316

(22) PCT Filed: Jul. 23, 2021

(86) PCT No.: PCT/CN2021/108194
§ 371 (c)(1),
(2) Date: Nov. 4, 2022

(87) PCT Pub. No.: WO2022/022421
PCT Pub. Date: Feb. 3, 2022

(65) Prior Publication Data
US 2023/0244879 A1  Aug. 3, 2023

(30) Foreign Application Priority Data
Jul. 29, 2020 (CN) .......................... 202010746066.0

(51) Int. Cl.
*G06F 40/289* (2020.01)
*G06F 40/205* (2020.01)
(Continued)

(52) U.S. Cl.
CPC ............ *G06F 40/40* (2020.01); *G06F 40/205* (2020.01); *G06F 40/289* (2020.01); *G06F 40/30* (2020.01)

(58) Field of Classification Search
CPC .... G06F 40/30; G06F 40/289; G06F 16/3344; G06F 40/205; G06F 40/284;
(Continued)

(56) References Cited

U.S. PATENT DOCUMENTS

| 7,275,029 B1 | 9/2007 | Gao et al. |
| 2016/0293161 A1 | 10/2016 | Bocchieri et al. |

(Continued)

FOREIGN PATENT DOCUMENTS

| CN | 109858041 A | 6/2019 |
| CN | 110032644 A | 7/2019 |

(Continued)

OTHER PUBLICATIONS

Zhang et al, "Chinese sentence semantic matching based on multi-granularity fusion mode", May 2020, InPacific-Asia Conference on Knowledge Discovery and Data Mining May 6, 2020 (pp. 246-257). Cham: Springer International Publishing. (Year: 2020).*

(Continued)

*Primary Examiner* — Olujimi A Adesanya
(74) *Attorney, Agent, or Firm* — Alleman Hall & Tuttle LLP

(57) ABSTRACT

Disclosed are a language representation model system, a language representation model pre-training method, a natural language processing method, an electronic device, and a storage medium. The language representation model system includes: a word granularity language representation sub-model based on segmentation in units of words, and a phrase granularity language representation sub-model based on segmentation in units of words. The word granularity language representation sub-model is configured to output, based on a sentence segmented in units of words, a first semantic vector corresponding to a semantic expressed by each segmented word in the sentence. The phrase granularity (Continued)

language representation sub-model is configured to output, based on the sentence segmented in units of phrases, a second semantic vector corresponding to a semantic expressed by each segmented phrase in the sentence.

20 Claims, 3 Drawing Sheets

(51) Int. Cl.
*G06F 40/284* (2020.01)
*G06F 40/30* (2020.01)
*G06F 40/40* (2020.01)

(58) Field of Classification Search
CPC .... G06F 40/279; G06F 40/247; G06F 40/216; G06F 16/3347; G06F 40/44; G06F 16/3346; G06F 40/10
See application file for complete search history.

(56) References Cited

U.S. PATENT DOCUMENTS

| | | | |
|---|---|---|---|
| 2018/0137855 | A1 | 5/2018 | Lee et al. |
| 2018/0260381 | A1* | 9/2018 | Carreras .............. G06F 40/289 |
| 2021/0089765 | A1* | 3/2021 | Ling ..................... G16H 50/20 |
| 2021/0103854 | A1* | 4/2021 | Misra .................... G06F 40/30 |
| 2021/0150255 | A1* | 5/2021 | Wang .................... G06F 18/22 |
| 2021/0182490 | A1* | 6/2021 | Guo ..................... G06F 40/284 |
| 2022/0019745 | A1* | 1/2022 | Jin ....................... G06F 16/285 |
| 2022/0101113 | A1* | 3/2022 | Tam ..................... G06N 3/045 |

FOREIGN PATENT DOCUMENTS

| | | |
|---|---|---|
| CN | 110489555 A | 11/2019 |
| CN | 110674639 A | 1/2020 |
| CN | 110717339 A | 1/2020 |
| CN | 111078842 A | 4/2020 |
| CN | 111310438 A | 6/2020 |
| CN | 111354333 A | 6/2020 |
| CN | 111400470 A | 7/2020 |
| CN | 111435408 A | 7/2020 |
| CN | 111914551 A | 11/2020 |
| IN | 551935 A | 10/2024 |
| JP | 2019212115 A | 12/2019 |

OTHER PUBLICATIONS

Yin et al, "Multigrancnn: An architecture for general matching of text chunks on multiple levels of granularity", 2015 In Proceedings of the 53rd Annual Meeting of the ACL and the 7th International Joint Conference on Natural Language Processing (vol. 1: Long Papers) Jul. 2015 (Year: 2015).*
Mikolov et al, "Distributed representations of words and phrases and their compositionality", 2013, Advances in neural information processing systems. 2013;26. (Year: 2013).*
Wang et al, "Multi-perspective context matching for machine comprehension", 2016, arXiv preprint arXiv:1612.04211. Dec. 13, 2016. (Year: 2016).*
Japan Patent Office, Office Action Issued in Application No. 2023504177, Apr. 2, 2024, 8 pages.
Intellectual Property India, Office Action Issued in Application No. 202227063955, Jul. 21, 2023, 8 pages.
European Patent Office, Communication pursuant to Article 94(3) EPC for European Application No. 21848640.5, mailed Oct. 2, 2024, 9 pages.
Devlin et al.; BERT: Pre-training of Deep Bidirectional Transformers for Language Understanding; Computational Linguistics: Human Language Technologies;, arXiv, 2019; p. 4171- 4186. 16 Pages.
Japan Patent Office, Notice of Reasons for Refusal for Japanese Application No. 2023504177, mailed Oct. 8, 2024, 8 Pages.
European Patent Office, Extended European Search Report Issued in Application No. 21848640.5, Aug. 29, 2023, 7 pages.
China National Intellectual Property Administration, Notice of Allowance issued in Chinese Application No. 202010746066.0, Apr. 15, 2022, 31 pages.
China National Intellectual Property Administration, Office action issued in Chinese Application No. 202010746066.0, Apr. 27, 2021, 13 pages. (Submitted with English Summary of Office action).
China National Intellectual Property Administration, Office action issued in Chinese Application No. 202010746066.0, Sep. 22, 2021, 9 pages. (Submitted with English Summary of Office action).
ISA China Patent Office, International Search Report and Written Opinion issued in Application No. PCT/CN2021/108194, Oct. 13, 2021, WIPO, 10 pages.

* cited by examiner

LANGUAGE REPRESENTATION MODEL SYSTEM, PRE-TRAINING METHOD AND APPARATUS, DEVICE, AND MEDIUM

CROSS-REFERENCE TO RELATED APPLICATIONS

This application is a national stage of the International application PCT/CN2021/108194, filed on Jul. 23, 2021. This International application claims priority to Chinese Patent Application No. 202010746066.0, filed on Jul. 29, 2020. All of these applications are hereby incorporated by reference in their entireties.

TECHNICAL FIELD

Embodiments of the present disclosure relate to the field of computer technologies, and particularly to a language representation model system, a language representation model pre-training method and apparatus, a natural language processing method and apparatus, an electronic device and a storage medium.

BACKGROUND

With the development of artificial intelligence technology, applications related to natural language processing have become ubiquitous. Common applications related to natural language processing include, for example, machine translation, intelligent question-answering robots, and machine reading comprehension. The rapid development of applications related to natural language processing is largely due to an idea of implementing transfer learning through a language representation model. In the field of natural language processing, the essence of transfer learning is to first perform pre-training, with a sample set, on a language representation model, and then perform, according to a specific natural language processing task, secondary fine-tuning training on the pre-trained language representation model, so that the trained language representation model can perform natural language processing tasks of different functions, such as semantic analysis, text classification, language reasoning and other processing tasks.

SUMMARY

The embodiments of the present disclosure provide a language representation model system, a language representation model pre-training method and apparatus, a natural language processing method and apparatus, an electronic device, and a medium. A mixed-granularity language representation model is provided, where such mixed-granularity language representation model is capable of performing, in units of phrases, a phrase granularity representation on a nature language and performing, in units of words, a word granularity representation on the nature language. This provides a model basis for a downstream natural language processing task, and is conductive to improvement of the processing precision of the downstream natural language processing task, and to improvement of the transfer effect of the language representation model.

In a first aspect, an embodiment of the present disclosure provides a language representation model system, including:
a word granularity language representation sub-model based on segmentation in units of words, and a phrase granularity language representation sub-model based on segmentation in units of phrase,
where the word granularity language representation sub-model is configured to output, based on a sentence segmented in units of words, a first semantic vector corresponding to a semantic expressed by each segmented word in the sentence; and
the phrase granularity language representation sub-model is configured to output, based on the sentence segmented in units of phrases, a second semantic vector corresponding to a semantic expressed by each segmented phrase in the sentence.

In a second aspect, an embodiment of the present disclosure further provides a language representation model pre-training method, including:
determining a corpus sample for pre-training;
segmenting the corpus sample in units of phrases to obtain a phrase segmentation result, and segmenting the corpus sample in units of words to obtain a word segmentation result; pre-training, with the phrase segmentation result, a phrase granularity language representation sub-model, that is based on segmentation in units of phrases, of a language representation model, to obtain a pre-trained phrase granularity language representation sub-model; and
pre-training, with the word segmentation result, a word granularity language representation sub-model, that is based on segmentation in units of words, of the language representation model, to obtain a pre-trained word granularity language representation sub-model.

In a third aspect, an embodiment of the present disclosure further provides a natural language processing method, including:
determining a fine-tuning sample corpus based on a natural language processing task;
segmenting the fine-tuning sample corpus in units of phrases to obtain a fine-tuning phrase segmentation result, and segmenting the fine-tuning sample corpus in units of words to obtain a fine-tuning word segmentation result;
fine-tuning a pre-trained language representation model, by using the fine-tuning phrase segmentation result and the fine-tuning word segmentation result; and
processing, by the fine-tuned language representation model, a to-be-processed natural language.

In a fourth aspect, an embodiment of the present disclosure further provides a language representation model pre-training apparatus, including:
a determining module, configured to determine a corpus sample for pre-training;
a segmenting module, configured to segment the corpus sample in units of phrases to obtain a phrase segmentation result, and segment the corpus sample in units of words to obtain a word segmentation result;
a first pre-training module, configured to pre-train, with the phrase segmentation result, a phrase granularity language representation sub-model, that is based on segmentation in units of phrases, of a language representation model, to obtain a pre-trained phrase granularity language representation sub-model; and
a second pre-training module, configured to pre-train, with the word segmentation result, a word granularity language representation sub-model, that is based on segmentation in units of words, of the language representation model, to obtain a pre-trained word granularity language representation sub-model.

In a fifth aspect, an embodiment of the present disclosure further provides a natural language processing apparatus, including:

a determining module, configured to determine a fine-tuning sample corpus based on a natural language processing task;

a segmenting module, configured to segment the fine-tuning sample corpus in units of phrases to obtain a fine-tuning phrase segmentation result, and segment the fine-tuning sample corpus in units of words to obtain a fine-tuning word segmentation result;

a fine-tuning module, configured to fine-tune a pre-trained language representation model, by using the fine-tuning phrase segmentation result and the fine-tuning word segmentation result; and a processing module, configured to process, by the fine-tuned language representation model, a to-be-processed natural language.

In a sixth aspect, an embodiment of the present disclosure further provides a device, including:

one or more processors; and a storage apparatus, configured to store one or more programs, where the one or more programs, when being executed by the one or more processors, cause the one or more processors to implement the language representation model pre-training method as described in any one of the embodiments of the present disclosure.

In a seventh aspect, an embodiment of the present disclosure further provides a storage medium containing computer-executable instructions, where the computer-executable instructions, when being executed by a computer processor, cause the language representation model pre-training method as described in any one of the embodiments of the present disclosure to be implemented.

In an eighth aspect, an embodiment of the present disclosure further provides a storage medium containing computer-executable instructions, where the computer-executable instructions, when being executed by a computer processor, cause the natural language processing method as described in any one of the embodiments of the present disclosure to be implemented.

In a ninth aspect, an embodiment of the present disclosure further provides a computer program product, including a computer program carried on a non-transitory computer-readable medium, where the computer program includes program codes for implementing the language representation model pre-training method as described in any one of the embodiments of the present disclosure.

In a tenth aspect, an embodiment of the present disclosure further provides a computer program product, including a computer program carried on a non-transitory computer-readable medium, where the computer program includes program codes for implementing the natural language processing method as described in any one of the embodiments of the present disclosure.

In an eleventh aspect, an embodiment of the present disclosure further provides a computer program, including a computer program carried on a non-transitory computer-readable medium, where the computer program includes program codes which, when being executed by a processing apparatus, cause the processing apparatus to implement the language representation model pre-training method as described in any one of the embodiments of the present disclosure.

In a twelfth aspect, an embodiment of the present disclosure further provides a computer program, including a computer program carried on a non-transitory computer-readable medium, where the computer program includes program codes which, when being executed by a processing apparatus, cause the processing apparatus to implement the natural language processing method as described in any one of the embodiments of the present disclosure. A language representation model system according to an embodiment of the present disclosure includes: a word granularity language representation sub-model based on segmentation in units of words, and a phrase granularity language representation sub-model based on segmentation in units of phrases, where the word granularity language representation sub-model is configured to output, based on a sentence segmented in units of words, a first semantic vector corresponding to a semantic expressed by each segmented word in the sentence, and the phrase granularity language representation sub-model is configured to output, based on the sentence segmented in units of phrases, a second semantic vector corresponding to a semantic expressed by each segmented phrase in the sentence. Based on such technical means, a mixed-granularity language representation model is provided, which is capable of performing, in units of phrases, a phrase granularity representation on a nature language and performing, in units of words, a word granularity representation on the nature language, respectively. This provides a model basis for a downstream natural language processing task, and is conductive to improvement of the processing precision of the downstream natural language processing task, and to improvement of the transfer effect of the language representation model.

BRIEF DESCRIPTION OF DRAWINGS

The above-described and other features, advantages and aspects of the embodiments of the present disclosure will become more evident in combination with the accompanying drawings and with reference to the following specific embodiments. Throughout the drawings, the same or similar reference numerals represent the same or similar elements. It should be understood that the drawings are schematic and that the components and elements are not necessarily drawn to scale.

FIG. 7 is a schematic structural diagram of a language representation model pre-training apparatus according to Embodiment 5 of the present disclosure.

FIG. 8 is a schematic structural diagram of a natural language processing apparatus according to Embodiment 6 of the present disclosure.

FIG. 9 is a schematic structural diagram of an electronic device according to Embodiment 7 of the present disclosure.

DESCRIPTION OF EMBODIMENTS

Figure 1:
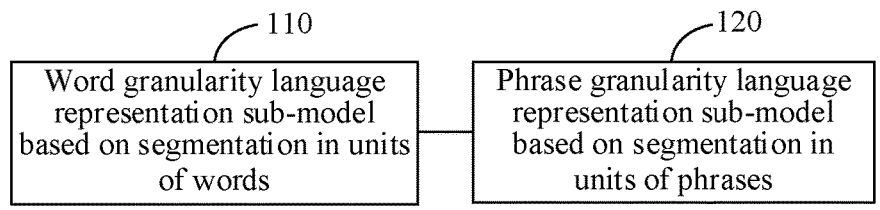
FIG. 1 is a schematic structural diagram of a language representation model system according to Embodiment 1 of the present disclosure.

The embodiments of the present disclosure will be described hereafter in detail with reference to the accompanying drawings. Although some embodiments of the present disclosure are shown in the accompanying drawings, it will be appreciated that the present disclosure can be implemented in various forms and should not be interpreted as being limited to the embodiments described herein. On the contrary, these embodiments are provided to more thoroughly and comprehensibly understand the present disclosure. It will be appreciated that the drawings and the embodiments of the present disclosure are only illustrative and are not intended to limit the scope of protection of the present disclosure.

It will be appreciated that the steps recited in the method embodiments of the present disclosure may be executed in different orders and/or in parallel. Further, the method embodiments may include an additional step and/or the execution of a step shown may be omitted. The scope of the present disclosure is not limited in this respect.

The term "include" and variants thereof herein are intended for an open inclusion, that is, "including but not limited to". The term "based on" means "at least partially based on". The term "an embodiment" means "at least one embodiment"; the term "another embodiment" means "at least one further embodiment"; the term "some embodiments" means "at least some embodiments". Relevant definitions of other terms are given in the following description.

It should be noted that concepts such as "first", "second" and the like mentioned in the present disclosure are simply used to distinguish different apparatuses, modules or units, but not to limit the order or interdependence of functions performed by these apparatuses, modules or units.

It should be noted that the modifiers "one" and "multiple" mentioned in the present disclosure are exemplary rather than restrictive. Those skilled in the art should understand that they should be interpreted as "one or more" unless explicitly indicated in the context otherwise.

At present, the common language representation model is typically a single granularity language representation model, such as a word granularity language representation model based on segmentation in units of words or a phrase granularity language representation model based on segmentation in units of phrases.

During conceiving the present disclosure, the inventors found that the above-described word granularity language representation model based on segmentation in units of words does not consider a problem that an incorrect attention weight would be assigned to a word. When a word has no relationship with another word in a specific context, but it is given an unreasonable attention weight because these two words are closely related in sample corpus training, this leads to a problem that the semantic of this word is incorrectly represented in the specific context. The above-described phrase granularity language representation model based on segmentation in units of phrases would render incorrect semantic parsing due to incorrect segmentation.

Embodiment 1

FIG. 1 is a schematic structural diagram of a language representation model system according to Embodiment 1 of the present disclosure. As shown in FIG. 1, the system includes: a word granularity language representation sub-model 110 based on segmentation in units of words, and a phrase granularity language representation sub-model 120 based on segmentation in units of phrases.

Among them, the word granularity language representation sub-model 110 is configured to output, based on a sentence segmented in units of words, a first semantic vector corresponding to a semantic expressed by each segmented word in the sentence.

The phrase granularity language representation sub-model 120 is configured to output, based on the sentence segmented in units of phrases, a second semantic vector corresponding to a semantic expressed by each segmented phrase in the sentence.

Taking a Chinese sentence "商店里的乒乓球拍卖完了 ("shang dian li de ping pang qiu pai mai wan le" in Chinese Pinyin)" as an example, the sentence is segmented in units of words, and a word segmentation result of "商 / 店 / 里 / 的 / 乒 / 乓 / 球 / 拍 / 卖 / 完 / 了 (shang/dian/li/de/ping/pang/qiu/pai/mai/wan/le)" is obtained; in addition, the sentence is segmented in units of phrases, and a phrase segmentation result of "商店/里/的/乒乓球/拍卖/完/了 (shang dian/li/de/ping pang qiu/pai mai/wan/le)" is obtained. It can be seen that, in the context of the above sentence, the sentence would be semantically misunderstood if it is segmented in units phrases, because the word "拍 (pai)" out of "乒乓球拍 (ping pang qiu pai)" is incorrectly segmented and associated with "卖 (mai)", where "乒乓球拍(ping pang qiu pai)" is a Chinese phrase which means a table-tennis bat, where "fs (pai mai)" is a Chinese phrase which means auction. Therefore, if the phrase granularity language representation sub-model 120 is used alone, an accurate comprehension is impossible for semantics of the above sentence and similar sentences, and normally, incorrect parsing would be rendered due to incorrect segmentation.

Taking an English sentence "we want to hang a portrait in drawing room" as an example, the sentence is segmented in units of words, and a word segmentation result of "we/want/to/hang/a/portrait/in drawing/room" is obtained; in addition, the sentence is segmented in units of phrases, and a phrase segmentation result of "we/want to/hang/a/portrait/in drawing room" is obtained. It can be seen that, in the context of the above sentence, the sentence would be semantically misunderstood if it is segmented in units of words. That's because "portrait" appears in front of "drawing", the system may easily come up with an interpretation that "drawing" is associated with "portrait" in meaning, that is, interprets "drawing" as painting. However, "drawing" is associated with "room" in the above sentence, which should be interpreted as "living room". Therefore, if the word granularity language representation sub-model 110 is used alone, an accurate comprehension is impossible for semantics of the above sentence "we want to hang a portrait in drawing room" and similar sentences.

In view of the above problems, the language representation model provided according to the present embodiment includes both the word granularity language representation sub-model based on segmentation based on segmentation in units of words and the phrase granularity language representation sub-model in units of phrases. For a same sentence, not only the first semantic vector corresponding to the semantic expressed by each segmented word in the sentence can be expressed, but also the second semantic vector corresponding to the semantic expressed by each segmented phrase in the sentence can be expressed, thereby providing a semantic comprehension basis for a downstream natural language processing task. In a specific language processing task, a phrase granularity feature is corrected by a word granularity feature, and the word granularity feature is expression-enriched by the phrase granularity feature, thereby contributing to improvement of the processing precision of the downstream natural language processing task, and improving the transfer effect of the language representation model.

Embodiment 2

Figure 2:
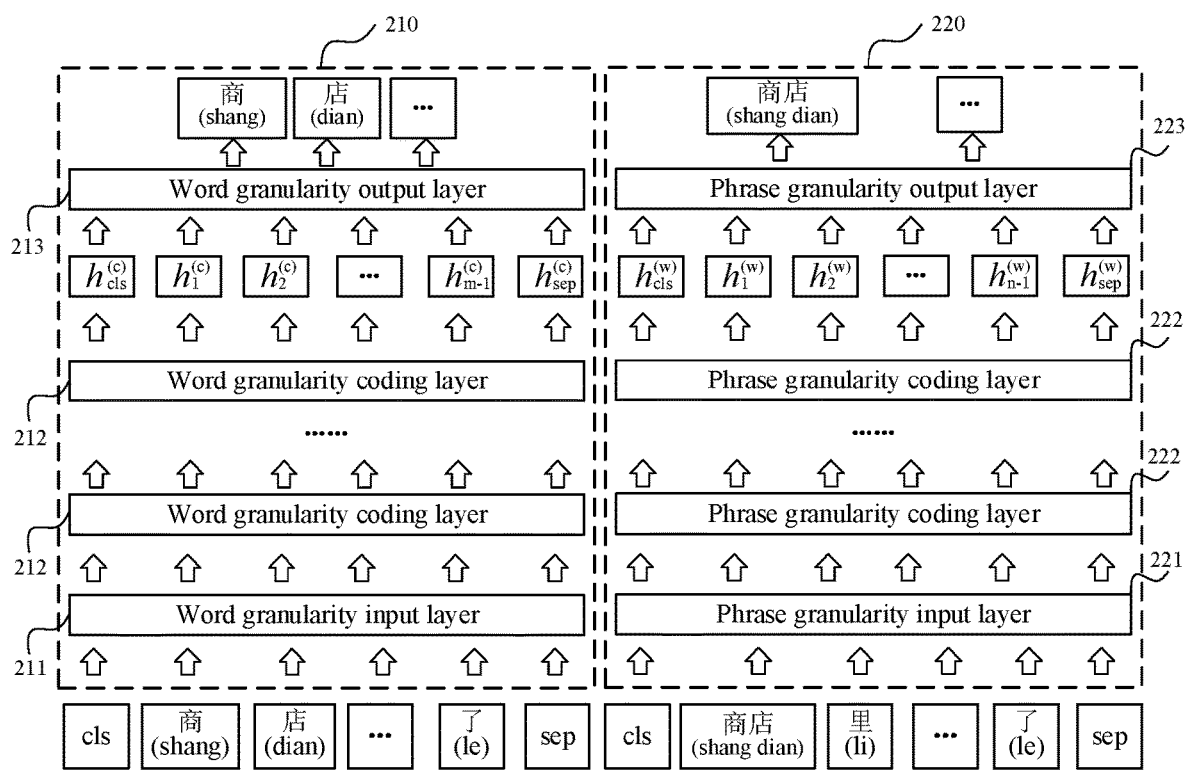
FIG. 2 is another schematic structural diagram of a language representation model system according to Embodiment 2 of the present disclosure.

FIG. 2 is another schematic structural diagram of a language representation model system according to Embodiment 2 of the present disclosure. On the basis of the above embodiment, the structures of the phrase granularity language representation sub-model and the word granularity language representation sub-model are respectively further described in this embodiment of the present disclosure. In particular, the structures of the phrase granularity language representation sub-model and the word granularity language representation sub-model are provided.

As shown in FIG. 2, the word granularity language representation sub-model 210 includes a word granularity input layer 211, a word granularity coding layer 212 and a word granularity output layer 213, all of the word granularity input layer, the word granularity coding layer and the word granularity output layer being based on segmentation in units of words. Among them, the word granularity input layer 211 is connected with the word granularity coding layer 212, and is configured to: receive a sentence segmented in units of words, convert each segmented word into a corresponding word vector through combining a position of the segmented word in the sentence and a paragraph where the sentence is located, and send the word vector to the word granularity coding layer 212. The word granularity coding layer 212 is connected with the word granularity output layer 213, and is configured to: determine, based on the received word vector, the first semantic vector corresponding to the semantic expressed by each segmented word in the sentence, and output the first semantic vector to the word granularity output layer 213. The word granularity output layer 213 is configured to output the received first semantic vector. There are at least two word granularity coding layer 213, and each word granularity coding layer is of a Transformer structure.

The phrase granularity language representation sub-model 220 includes a phrase granularity input layer 221, a phrase granularity coding layer 222 and a phrase granularity output layer 223, all of the phrase granularity input layer, the phrase granularity coding layer and the phrase granularity output layer being based on segmentation in units of phrases.

Among them, the phrase granularity input layer 221 is connected with the phrase granularity coding layer 222, and is configured to: receive the sentence segmented in units of phrases, convert each segmented phrase into a corresponding phrase vector through combining a position of the segmented phrase in the sentence and the paragraph where the sentence is located, and send the phrase vector to the phrase granularity coding layer 222. In this way, the phrase vector corresponding to each segmented phrase includes a position vector and a paragraph vector of the segmented phrase, and an embedding vector (embedding) of a corresponding segmented phrase that is learned in advance. The phrase granularity coding layer 222 is connected with the phrase granularity output layer 223, and is configured to: determine, based on the received phrase vector, the second semantic vector corresponding to the semantic expressed by each segmented phrase in the sentence, and output the second semantic vector to the phrase granularity output layer 223. The phrase granularity output layer 223 is configured to output the received second semantic vector. There are at least two phrase granularity coding layer 222, and each phrase granularity coding layer 222 is of a Transformer structure. The Transformer structure includes an encoding component, a decoding component and a connection relationship therebetween. The encoding component is generally composed of at least two encoders, and the decoding component is composed of decoders having the same number as the encoders. The encoders are arranged in two layers: a self-attention layer and a feed-forward neural network layer. The self-attention layer aids a current node in more than simply giving attention to a current phrase, to obtain the semantics of the context. The decodes also includes a self-attention layer and a feed-forward neural network layer, but there is a further attention layer between the two layers to aid a current node in obtaining key contents that need to be paid attention currently. The Transformer structure is widely used in the field of natural language processing NLP, such as machine translation, question-answering system, text summarization, speech recognition and other aspects, and its performance is superior.

As shown in FIG. 2, "cls" represents the beginning of a sentence, and "sep" represents the end of the sentence.

According to the technical solution in the embodiments of the present disclosure, the word granularity language representation sub-model includes a word granularity input layer, a word granularity coding layer and a word granularity output layer each being based on segmentation in units of words, and the phrase granularity language representation sub-model includes a phrase granularity input layer, a phrase granularity coding layer and a phrase granularity output layer each being based on segmentation in units of phrases. In this way, for a same sentence, a semantic representation of each segmented phrase in phrase granularity and a semantic representation of each word in word granularity are given. This provides a comprehension basis for a downstream natural language processing task, and is conductive to improvement of the processing precision of the downstream natural language processing task, and to improvement of the transfer effect of the language representation model.

Embodiment 3

Figure 3:
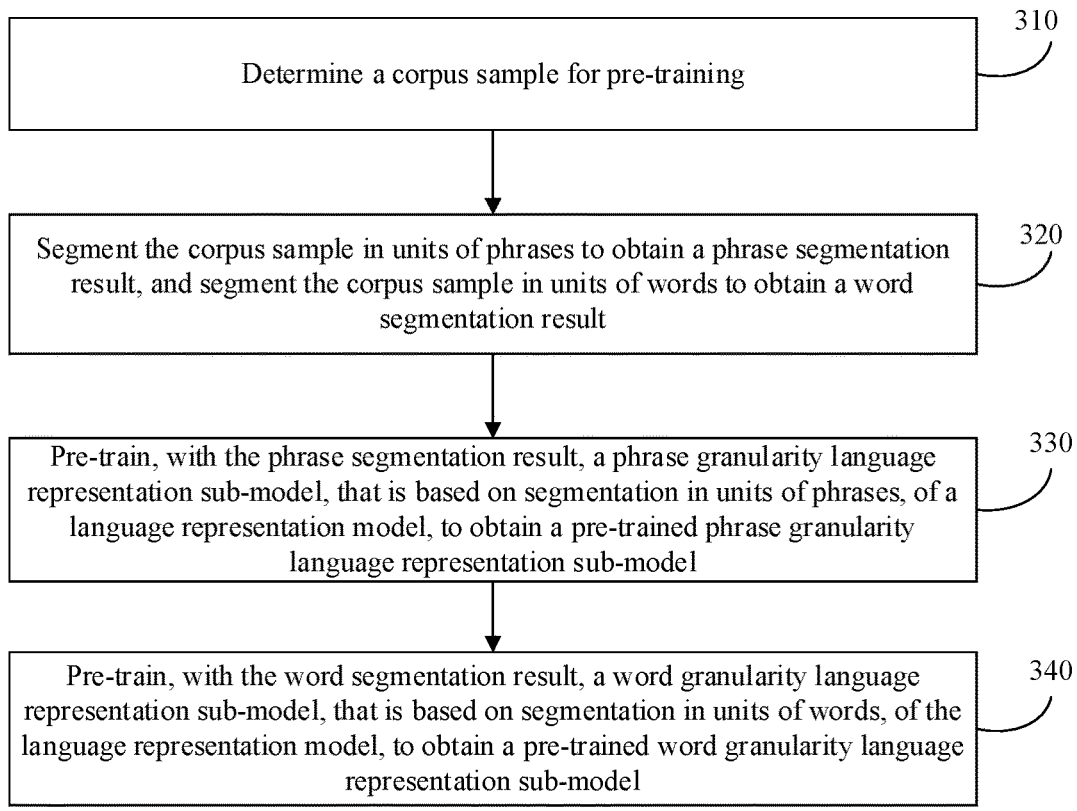
FIG. 3 is a schematic flowchart of a language representation model pre-training method according to Embodiment 3 of the present disclosure.

FIG. 3 shows a language representation model pre-training method according to Embodiment 3 of the present disclosure. This method is used to pre-train the language representation model described in the above embodiments, so that the language representation model has a function of performing semantic representations on an input sentence not only in phrase granularity but also in word granularity, thereby providing a comprehension basis for a downstream natural language processing task. As shown in FIG. 3, the method includes the following steps.

At step 310, a corpus sample for pre-training is determined.

The corpus sample may be obtained from a common website, or is collected and sorted manually for sentences that are prone to ambiguity. The sentences that are prone to ambiguity include, for example, a Chinese sentence "商店里的乒乓球拍卖完了 ("shang dian li de ping pang qiu pai mai wan le" in Chinese Pinyin) ", an English sentence "we want to hang a portrait in drawing room" or the like.

At step 320, the corpus sample is segmented in units of phrases to obtain a phrase segmentation result, and the corpus sample is segmented in units of words to obtain a word segmentation result.

Taking the Chinese sentence "商店里的乒乓球拍卖完了 ("shang dian li de ping pang qiu pai mai wan le" in Chinese Pinyin)" as an example, the sentence is segmented in units of words, and a word segmentation result of "商 / 店 / 里 / 的 / 乒 / 乓 / 球 / 拍 / 卖 / 完 / 了 (shang/dian/li/de/ping/pang/qiu/pai/mai/wan/le)" is obtained; in addition, the sentence is segmented in units of phrases, and a phrase segmentation result of "商店/里/的/乒乓球/拍卖/完/了(shang dian/li/de/ping pang qiu/pai mai/wan/le)" is obtained.

Taking the English sentence "we want to hang a portrait in drawing room" as an example, the sentence is segmented in units of words, and a word segmentation result of "we/want/to/hang/a/portrait/in drawing/room" is obtained; in addition, the sentence is segmented in units of phrases, and a phrase segmentation result of "we/want to/hang/a/portrait/in drawing room" is obtained.

At step 330, a phrase granularity language representation sub-model, that is based on segmentation in units of phrases, of a language representation model is pre-trained by using the phrase segmentation result, to obtain a pre-trained phrase granularity language representation sub-model.

Figure 4:
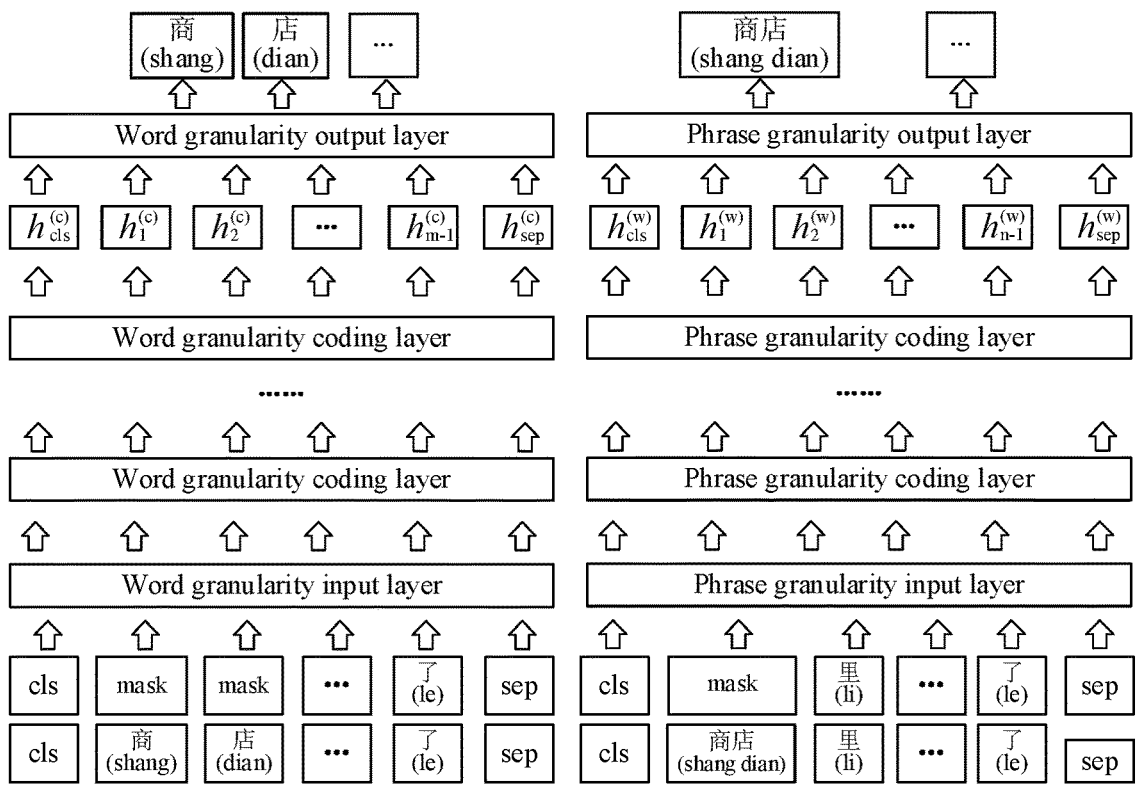
FIG. 4 is another schematic flowchart of the language representation model pre-training method according to Embodiment 3 of the present disclosure.

Exemplarily, with reference to another schematic flowchart of the language representation model pre-training method shown in FIG. 4, the pre-training, with the phrase segmentation result, the phrase granularity language representation sub-model, that is based on segmentation in units of phrases, of the language representation model includes:

masking (MASK) a set proportion of segmented phrases from the phrase segmentation result that is in units of phrases;

inputting the masked segmented phrases and remaining unmasked segmented phrases of the phrase segmentation result to the phrase granularity input layer of the phrase granularity language representation sub-model, to convert, by the phrase granularity input layer, each segmented phrase into a corresponding phrase vector through combining a position of the segmented phrase in a corpus of the corpus sample and a paragraph where the corpus is located, and send, by the phrase granularity input layer, the phrase vector to the phrase granularity coding layer of the phrase granularity language representation sub-model;

determining, by the phrase granularity coding layer, a second semantic vector corresponding to a semantic expressed by each segmented phrase in the corpus, and outputting, by the phrase granularity coding layer, the second semantic vector to the phrase granularity output layer of the phrase granularity language representation sub-model;

outputting, by the phrase granularity output layer, the masked segmented phrases based on the second semantic vectors of individual segmented phrases; and ending the pre-training when an accuracy that the phrase granularity output layer outputs the masked segmented phrases reaches a second threshold.

The set proportion is generally 15%. 15% of the segmented phrases from the phrase segmentation result are randomly determined, and masking (MASK) is performed on these determined segmented phrases. Specifically, a preset embedding vector that does not represent any meaning is used to represent a segmented phrase that needs to be masked. However, for each segmented phrase, regardless of whether it needs to be masked or does not need to be masked, a position identifier and a paragraph identifier are added therefor. The position identifier represents a position of a current segmented phrase in a current sentence, and the paragraph identifier represents a paragraph of the sentence where the current segmented phrase is located.

The phrase granularity output layer is specifically configured to predict the masked segmented phrase, based on the position identifier and the paragraph identifier of the masked segmented phrase, and in combination with semantics of a previous segmented phrase and a next segmented phrase that precedes and follows the masked segmented phrase respectively. In particular, the phrase granularity output layer is configured to calculate a probability at which the masked segmented phrase is some certain segmented phrase and output a segmented phrase with the highest probability. As shown in FIG. 4, the masked segmented phrase "商店 (shang dian)" is output at the phrase granularity output layer finally, and the masked words "商(shang)" and "店 (dian)" are output at the word granularity output layer finally.

At step 340, a word granularity language representation sub-model, that is based on segmentation in units of words, of the language representation model is pre-trained by using the word segmentation result, to obtain a pre-trained word granularity language representation sub-model.

The process for pre-training the word granularity language representation sub-model is similar to that for pre-training the phrase granularity language representation sub-model.

Exemplarily, the pre-training, with the word segmentation result, the word granularity language representation sub-model, that is based on segmentation in units of words, of the language representation model includes:

masking a set proportion of segmented words from the word segmentation result that is in units of words;

inputting the masked segmented words and remaining unmasked segmented words of the word segmentation result to the word granularity input layer of the word granularity language representation sub-model, to convert, by the word granularity input layer, each segmented word into a corresponding word vector through combining a position of the segmented word in the corpus and the paragraph where the corpus is located, and sending, by the word granularity input layer, the word vector to the word granularity coding layer of the word granularity language representation sub-model;

determining, by the word granularity coding layer, a first semantic vector corresponding to a semantic expressed by each segmented word in the corpus, and outputting, by the word granularity coding layer, the first semantic vector to the word granularity output layer of the word granularity language representation sub-model;

outputting, by the word granularity output layer, the masked segmented words based on the first semantic vectors of individual segmented words; and ending the pre-training when an accuracy that the word granularity output layer outputs the masked segmented words reaches a first threshold.

Further, there are at least two word granularity coding layers, and each word granularity coding layer is of a Transformer structure; and there are at least two phrase granularity coding layers, and each phrase granularity coding layer is of a Transformer structure. It should be noted that the language representation model includes the following parameters: a word vector parameter corresponding to the word granularity language representation sub-model; a phrase vector parameter corresponding to the phrase granularity language representation sub-model; and a Transformer association parameter, a position vector and a paragraph vector that are shared by the word granularity language representation sub-model and the phrase granularity language representation sub-model. The word vector parameter may specifically refer to an embedding vector (embedding) of each segmented word that is learned in advance, or to a correlation matrix used to determine the embedding vector. The phrase vector parameter may specifically refer to an embedding vector (embedding) of each segmented phrase that is learned in advance, or to a correlation matrix used to determine the embedding vector. The position vector specifically represents a position of a segmented phrase or word in a sentence, and the paragraph vector represents information on a paragraph of the sentence that is segmented. The position vector and the paragraph vector may be shared between the word granularity language representation sub-model and the phrase granularity language representation sub-model. Hence, it is sufficient to keep one set of the position vector and the paragraph vector. There is no need to save the position vector and the paragraph vector for each of the word granularity language representation sub-model and the phrase granularity language representation sub-model, so that the order of magnitude of model parameters can be reduced and the complexity of the language representation model can be lowered. The Transformer association parameter refers to a parameter learned in the pre-training process, such as a parameter of the fully connected layer.

It can be appreciated that there is no sequential limitation between step 330 and step 340. The operation of step 330 may be performed first, and then the operation of step 340; alternatively, the operation of step 340 may be performed first, and then the operation of step 330; alternatively, the operation of step 330 may be performed in parallel with the operation of step 340.

According to the language representation model pre-training method provided in the embodiments of the present disclosure, by segmenting a same sentence into segment units at different granularities and then pre-training, with the segment units at different granularities, language representation sub-models with different granularities, a mixed-granularity language representation model capable of representing an input sentence as both a semantic vector of a segmented phrase in the phrase granularity and a semantic vector of a segmented word in the word granularity is obtained. This provides a semantic comprehension basis for a downstream natural language processing task. In a specific language processing task, a phrase granularity feature is corrected by a word granularity feature, and the word granularity feature is expression-enriched by the phrase granularity feature, thereby contributing to improvement of the processing precision of the downstream natural language processing task, and improving the transfer effect of the language representation model.

Embodiment 4

Figure 5:
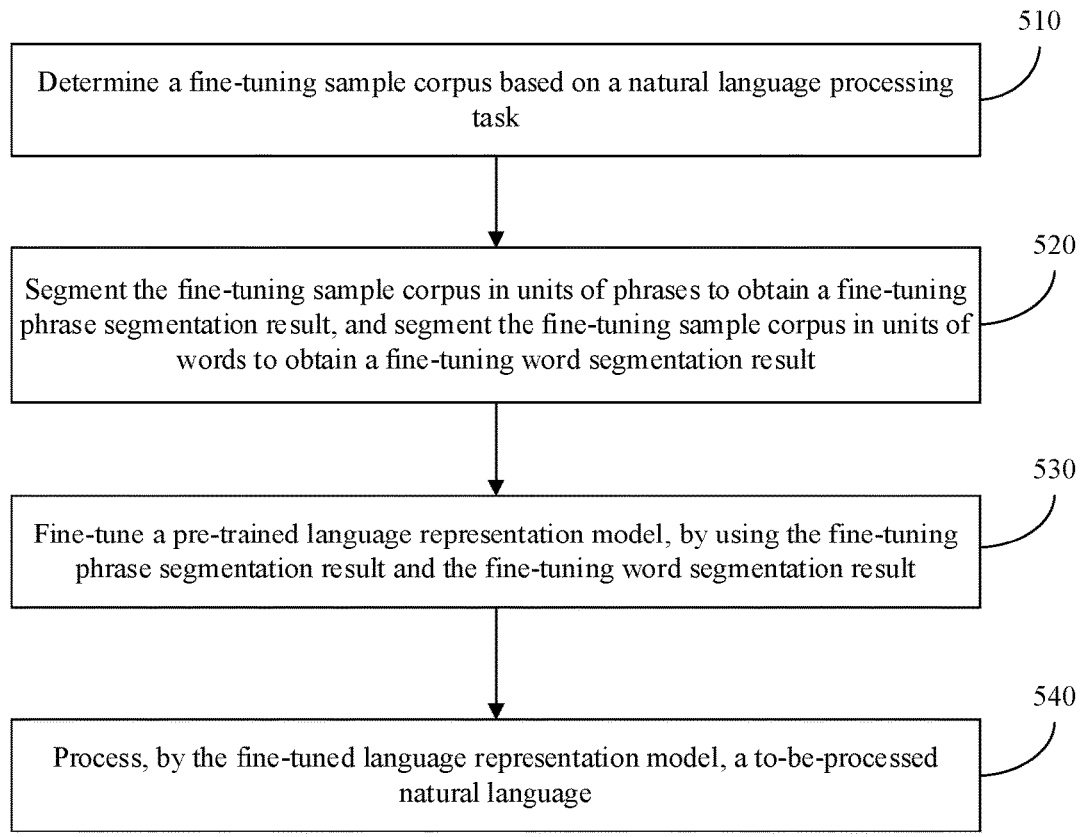
FIG. 5 is a schematic flowchart of a natural language processing method according to Embodiment 4 of the present disclosure.

FIG. 5 is a schematic flowchart of a natural language processing method according to Embodiment 4 of the present disclosure. Specifically, it is about execution of a specific natural language processing task based on the language representation model disclosed in the above embodiments. The natural language processing task includes at least one of: semantic similarity calculation, text classification, language reasoning, keyword recognition, and reading comprehension.

As shown in FIG. 5, the natural language processing method includes the following steps.

At step 510, a fine-tuning sample corpus is determined based on a natural language processing task.

The language representation model disclosed in the above embodiments is simply used for representing semantics of a sentence of a natural language at different granularities, and provides a comprehension basis for all natural language processing tasks. When there is a need to conduct a specific natural language processing task, it is also necessary to perform further fine-tuning training on the language representation model according to the specific natural language processing task.

For example, when the natural language processing task is semantic similarity calculation, the fine-tuning sample corpus is in a form of: sentence 1: sentence 2: similarity label; where the similarity label of "0" indicates that sentence 1 has a different meaning from sentence 2, that is, the two sentences are semantically dissimilar; the similarity label of "1" indicates that sentence 1 has the same meaning as sentence 2, that is, the two sentences are semantically similar.

When the natural language processing task is text classification, the fine-tuning sample corpus is in a form of: classification label: classification name: to-be-classified text.

At step 520, the fine-tuning sample corpus is segmented in units of phrases to obtain a fine-tuning phrase segmentation result, and the fine-tuning sample corpus is segmented in units of words to obtain a fine-tuning word segmentation result.

At step 530, a pre-trained language representation model is fine-tuned by using the fine-tuning phrase segmentation result and the fine-tuning word segmentation result.

That is, the fine-tuning phrase segmentation result and the fine-tuning word segmentation result are used to perform secondary training on the pre-trained language representation model, so that the language representation model can learn a specific task processing policy.

At step 540, a to-be-processed natural language is processed by the fine-tuned language representation model.

Figure 6:
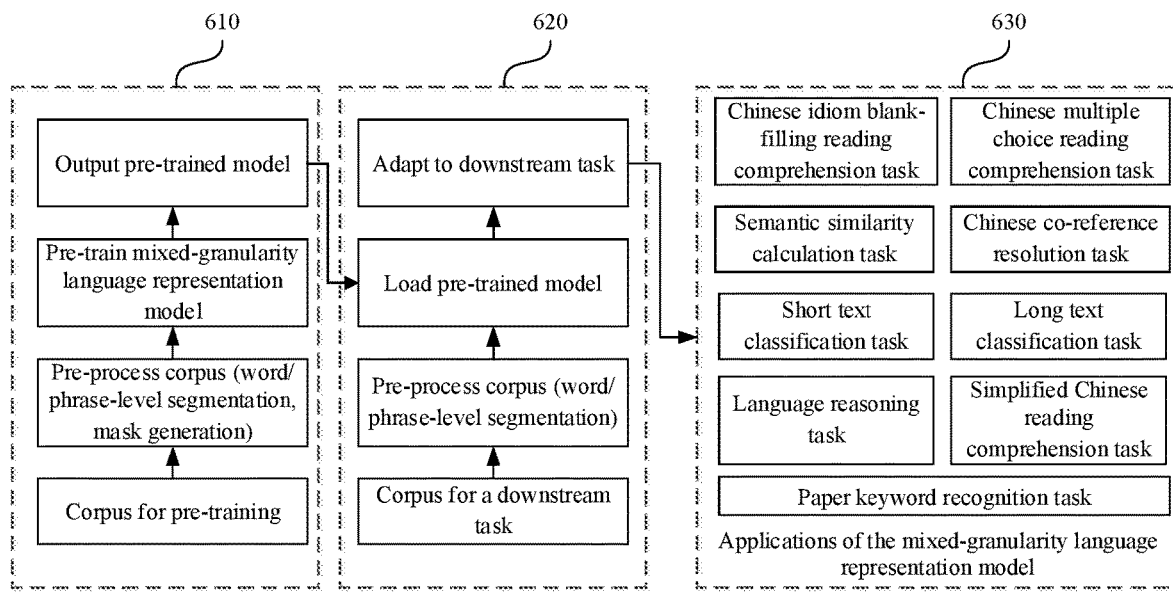
FIG. 6 is another schematic flowchart of the natural language processing method according to Embodiment 4 of the present disclosure.

Further, with reference to another flowchart of the natural language processing method shown in FIG. 6. Reference numeral 610 represents a pre-training stage of a mixed-granularity language representation model, which corresponds to contents disclosed in Embodiment 3 of the present disclosure. The mixed-granularity language representation model is the language representation model described in any of the above embodiments, which includes a word granularity language representation sub-model based on segmentation in units of words and a phrase granularity language representation sub-model based on segmentation in units of phrases, and which is hence termed as the mixed-granularity language representation model. Reference numeral 620 represents a stage of performing secondary training on a pre-trained language representation model, that is, a fine-tuning stage. Specifically, the pre-trained language representation model is fine-tuned according to a specific natural language processing task. Reference numeral 630 represents a downstream application scenario of the mixed-granularity language representation model, specifically including: a semantic similarity calculation task AFQMC, a short text classification task TNEWS, a long text classification task IFLYTEK, a language reasoning task CMNLI, a Chinese co-reference resolution task CLUEWSC2020, a paper keyword recognition task CSL, a simplified Chinese reading comprehension task CMRC2018, a Chinese idiom blank-filling reading comprehension task CHID, and a Chinese multiple choice reading comprehension task C3.

Among them, the semantic similarity calculation task AFQMC specifically refers to: for example, {"sentence1": "Where to increase the credit limit for Double Eleven", "sentence2": "In . . . , the credit limit can be increased", "label": "0"}; where each piece of data has three attributes, which are respectively sentence 1, sentence 2 and a sentence similarity label in a sequential order. For the sentence similarity label "label", 1 indicates that sentence1 has a similar meaning as sentence2, and 0 indicates that sentence1 has a difference meaning from sentence2. In the application of a specific task, firstly, the pre-trained language representation model described in the above embodiments is fine-tuned by using a pre-collected language corpus related to the specific task, that is, the pre-trained language representation model is re-trained to adapt it to the application of the specific task. Taking a case where the specific task is the semantic similarity calculation task as an example, firstly, a corpus having semantically similar sentences and a corpus having semantically dissimilar sentences are collected, and each corpus is represented in a form of for example {"sentence1": "Where to increase the credit limit for Double Eleven", "sentence2": "In . . . , the credit limit can be increased", "label": "0"}, where each piece of data has three attributes, which are respectively sentence 1, sentence 2 and a sentence similarity label in a sequential order (that is, for the sentence similarity label "label", 1 indicates that sentence1 has a similar meaning as sentence2, and 0 indicates that sentence1 has a difference meaning from sentence2). Then, the collected corpuses are used to re-train the pre-trained language representation model. In the re-training process, for sentences of a same corpus, since the trained language representation model can not only express a first semantic vector corresponding to a semantic expressed by each segmented word in each sentence but also a second semantic vector corresponding to a semantic expressed by each segmented phrase in the sentence, a phrase granularity feature is corrected by a word granularity feature, and the word granularity feature is expression-enriched by the phrase granularity feature. As such, the probability that the semantics of a sentence are incorrectly comprehended can be reduced, and the probability of incorrect parsing caused due to incorrect segmentation can be reduced. Further, the learning effect of a specific natural language processing task can be improved, thereby improving the accuracy of task processing. Accordingly, the pre-trained language representation model has an enhanced model transfer characteristic.

The short text classification task TNEWS specifically refers to: for example, {"label": "102", "label_des": "news_entertainment", "sentence": "Doughnut selfie, so beautiful in such a fascinating angle, the beauty attracts everything"}, where each piece of data has three attributes, which are respectively classification ID, classification name, and news string (which only includes a title) in a sequential order.

The long text classification task IFLYTEK specifically refers to: for example, {"label": "110", "label_des": "neighborhood supermarket", "sentence": "Kaixin Fast-reach Supermarket was founded in 2016, which is dedicated to building a one-stop shopping platform enabling 30-minute instant delivery for mobile terminals. Commodity categories include fruits, vegetables, meats, poultry products, eggs and milk, seafood and aquatic products, grain, oil, seasonings, alcohol and beverages, leisure food, daily necessities, take-out, etc. Kaixin hopes to become a faster, better, more diversified and economical online retail platform with a new business model by virtue of a more efficient and rapid warehousing and distribution mode, so as to bring consumers better shopping experience and become an Internet company respected by the society, meanwhile promoting the process of food safety. A try at Kaixin brings you good and fast experience: 1. the delivery time prompt is clearer and more friendly; 2. some optimizations are made to protect user privacy; 3. other adjustments are made to improve the use experience; and 4. some known bugs have been fixed"}, where each piece of data has three attributes, which are respectively category ID, category name and text content in a sequential order.

The language reasoning task CMNLI specifically refers to: for example, {"sentence1": "New rights are good enough", "sentence2": "Everyone likes the latest benefit", "label": "neutral"}, where each piece of data has three attributes, which are respectively sentence 1, sentence 2 and an implication relation label in a sequential order. There are three types of labels "label": neutral, entailment, and contradiction.

The Chinese co-reference resolution task CLUEWSC2020 specifically refers to that the language representation model determines what a specific object a pronoun refers to. In an example, {"target": {"span2_index": 37, "span1_index": 5, "span1_text": "bed", "span2_text": "it"}, "idx": 261, "label": "false", "text": "At this time, the mobile phone beside the pillow on the bed rang. I was surprised because it had been shut down for two months for arrears. Now it suddenly rang.", where "true" for "label" indicates that the pronoun does refer to the noun in span1_text, while "false" for "label" indicates that the pronoun does not refer to the noun in span1_text.

The paper keyword recognition task CSL specifically refers to excerpting from the abstract of a Chinese paper and its keywords, where the paper is selected from some core journals of Chinese social sciences and natural sciences. In an example, {"id": 1, "abst": "In order to solve the problem that traditional uniform FFT beamforming algorithm reduces the resolution of 3D sonar imaging, this paper presents a sub-region FFT beamforming algorithm. In the far field, the imaging area is partitioned into multiple regions using genetic algorithm as the optimization method. The objective of the optimization process is to minimize the number of partitions, with the constraints being the imaging resolution. In each region, a beam direction is selected to obtain the demodulated output when each receiving element receives the directional echo as the original data, and the traditional uniform FFT beamforming is performed in the region. The FFT computation process is optimized to reduce the computational complexity of the new algorithm to meet the real-time requirements of 3D imaging sonar. Simulation and experimental results show that the imaging resolution with the sub-region FFT beamforming algorithm is significantly improved over the traditional uniform FFT beamforming algorithm, and that the real-time requirements are met.", "keyword": ["underwater acoustics", "FFT", "beamforming", "3D imaging sonar"], "label": "1"}, where each piece of data has four attributes, which are respectively data ID, paper's abstract, keywords, as well as true and false label in a sequential order.

The simplified Chinese reading comprehension task CMRC2018 specifically refers to that: an answer needs to be found in a given article for a given question.

The Chinese idiom blank-filling reading comprehension task CHID specifically refers to that: for an article with some blanks formed by removing some idioms, the language representation model selects appropriate idioms, from listed candidate idioms, to fill in the blanks.

The Chinese multiple choice reading comprehension task C3 specifically refers to: based on a conversation, making selection for a multiple-option question related to contents of the conversation.

In the evaluation of the above nine tasks, the language representation model according to the embodiments of the present disclosure is greatly superior, in terms of task processing effects, to the single granularity language representation model trained by the same corpus, and to a publicly published language representation model of the same scale or even a larger scale. This is because the language representation model according to the embodiments of the present disclosure is a mixed-granularity language representation model, which includes both a word granularity language representation sub-model based on segmentation in units of words and a phrase granularity language representation sub-model based on segmentation in units of phrases. For a same natural language sentence, the language representation model according to the embodiments of the present disclosure can express not only the first semantic vector corresponding to the semantic expressed by each segmented word in the sentence but also a second semantic vector corresponding to the semantic expressed by each segmented phrase in the sentence. Thus, a phrase granularity feature is corrected by a word granularity feature, and the word granularity feature is expression-enriched by the phrase granularity feature. As such, the probability that the semantics of a sentence are incorrectly comprehended can be reduced, and the probability of incorrect parsing caused due to incorrect segmentation can be reduced. Further, the accuracy of task processing is improved.

Assuming Acc. represents the accuracy and EM represents the maximum matching accuracy, the comparisons of the task processing performance of various language representation models are shown in Table 1. For models BERT, RoBERta, ALBERT-xlarge, XLNet-Mid and ERNIE, the shown evaluation results are published. For some processing tasks (such as the short text classification task TNEWS, the Chinese co-reference resolution task CLUEWSC2020 and the paper keyword recognition task CSL), after being enhanced with data, they are re-evaluated using the language representation model according to the embodiments of the present disclosure. BERT recurrence refers to task processing results obtained by the applicant upon evaluation of the above processing tasks using BERT. The mixed-granularity language representation model refers to the language representation model according to the embodiments of the present disclosure, which includes both a word granularity language representation sub-model based on segmentation in units of words and a phrase granularity language representation sub-model based on segmentation in units of phrases. The mixed-granularity language representation represents an idea of language representations at mixed granularities, that is, for a same natural sentence, a semantic vector of each word in the sentence and a semantic vector of each phrase in the sentence are respectively expressed. The mixed-granularity language representation model can be obtained through extension based on any single granularity language representation model, where the single granularity language representation model may be, for example, BERT, RoBERta or ALBERT. It can be seen from Table 1 that the mixed-granularity language representation model outperformed other existing single granularity language representation models in most task processing applications, in terms of the performance and average score. Furthermore, with the same pre-training data, the mixed-granularity language representation model also outperformed the single granularity language representation model in terms of the processing performance.

TABLE 1

Comparisons of task processing performance of various language representation models

| Model name | Average score | AFQMC (Acc.) | TNEWS (Acc.) | IFLYTEK (Acc.) | CMNLI (Acc.) | CLUEWSC2020 (Acc.) | CSL (Acc.) | CMRC2018 (EM) | CHID (Acc.) | C3 (Acc.) |
|---|---|---|---|---|---|---|---|---|---|---|
| BERT | 72.35% | 73.70% | 66.99% | 60.29% | 79.69% | 71.03% | 84.00% | 71.60 | 82.04% | 64.50% |
| RoBERTa | 74.39% | 74.04% | 67.63% | 60.31% | 80.51% | 76.90% | 84.70% | 75.20 | 83.62% | 66.50% |
| ALBERT-xlarge | 73.05% | 69.96% | 66.00% | 59.50% | 81.13% | 69.31% | 84.40% | 76.30 | 80.57% | 70.32% |
| ERNIE | 74.20% | 73.83% | 68.15% | 58.96% | 80.29% | 80.00% | 85.50% | 74.70 | 82.28% | 64.10% |
| XLNet-Mid | 73.11% | 70.50% | 66.28% | 58.85% | 81.25% | 78.28% | 84.70% | 66.95 | 83.47% | 67.68% |
| BERT recurrence | 72.41% | 71.80% | 67.48% | 57.50% | 80.08% | 70.69% | 83.83% | 71.50 | 83.12% | 65.67% |
| Mixed-granularity language representation model | 75.28% | 73.87% | 68.58% | 59.73% | 81.87% | 78.28% | 85.70% | 73.25 | 86.62% | 69.63% |

In the natural language processing method provided in the embodiments of the present disclosure, the mixed-granularity language representation model disclosed in the above embodiments is subject to fine-tuning training in conjunction with a specific processing task, then a natural language task is processed based on the mixed-granularity language representation model after the fine-tuning training, where a phrase granularity feature is corrected by a word granularity feature and the word granularity feature is expression-enriched by the phrase granularity feature, thereby improving the processing precision of the natural language processing task.

Embodiment 5

FIG. 7 shows a language representation model pre-training apparatus according to Embodiment 5 of the present disclosure. Specifically, the apparatus includes a determining module 710, a segmenting module 720, a first pre-training module 730 and a second pre-training module 740.

The determining module 710 is configured to determine a corpus sample for pre-training. The segmenting module 720 is configured to segment the corpus sample in units of phrases to obtain a phrase segmentation result, and segment the corpus sample in units of words to obtain a word segmentation result. The first pre-training module 730 is configured to pre-train, with the phrase segmentation result, a phrase granularity language representation sub-model, that is based on segmentation in units of phrases, of a language representation model, to obtain a pre-trained phrase granularity language representation sub-model. The second pre-training module 740 is configured to pre-train, with the word segmentation result, a word granularity language representation sub-model, that is based on segmentation in units of words, of the language representation model, to obtain a pre-trained word granularity language representation sub-model.

Based on the above-described technical solution, the first pre-training module 730 includes:

a masking unit, configured to mask a set proportion of segmented phrases from the phrase segmentation result that is in units of phrases;

an inputting unit, configured to input the masked segmented phrases and remaining unmasked segmented phrases of the phrase segmentation result to a phrase granularity input layer of the phrase granularity language representation sub-model, to convert, by the phrase granularity input layer, each segmented phrase into a corresponding phrase vector through combining a position of the segmented phrase in a corpus of the corpus sample and a paragraph where the corpus is located, and send, by the phrase granularity input layer, the phrase vector to a phrase granularity coding layer of the phrase granularity language representation sub-model;

a determining unit, configured to determine, by the phrase granularity coding layer, a second semantic vector corresponding to a semantic expressed by each segmented phrase in the corpus, and output, by the phrase granularity coding layer, the second semantic vector to a phrase granularity output layer of the phrase granularity language representation sub-model; and an outputting unit, configured to output, by the phrase granularity output layer, the masked segmented phrases based on the second semantic vectors of individual segmented phrases, and end the pre-training when an accuracy that the phrase granularity output layer outputs the masked segmented phrases reaches a second threshold.

Based on the above-described technical solution, the second pre-training module 740 includes:

a masking unit, configured to mask a set proportion of segmented words from the word segmentation result that is in units of words;

an inputting unit, configured to input the masked segmented words and remaining unmasked segmented words of the word segmentation result to a word granularity input layer of the word granularity language representation sub-model, to convert, by word granularity input layer, each segmented word into a corresponding word vector through combining a position of the segmented word in the corpus of the corpus sample and the paragraph where the corpus is located, and send, by word granularity input layer, the word vector to a word granularity coding layer of the word granularity language representation sub-model;

a determining unit, configured to determine, by the word granularity coding layer, a first semantic vector corresponding to a semantic expressed by each segmented word in the corpus, and output, by word granularity coding layer, the first semantic vector to a word granularity output layer of the word granularity language representation sub-model; and an outputting unit, configured to output, by the word granularity output layer, the masked segmented words based on the first semantic vectors of individual segmented words, and end the pre-training when an accuracy that the word granularity output layer outputs the masked segmented words reaches a first threshold.

Based on the above-described technical solution, the language representation model includes the following parameters: a word vector parameter corresponding to the word granularity language representation sub-model; a phrase vector parameter corresponding to the phrase granularity language representation sub-model; and a Transformer association parameter, a position vector and a paragraph vector that are shared by the word granularity language representation sub-model and the phrase granularity language representation sub-model.

In the technical solutions provided in the embodiments of the present disclosure, by segmenting a same sentence into segment units at different granularities and then pre-training, with the segment units at different granularities, language representation sub-models with different granularities, a mixed-granularity language representation model capable of representing an input sentence as both a semantic vector of a segmented phrase in a phrase granularity and a semantic vector of a segmented word in a word granularity is obtained. This provides a semantic comprehension basis for a downstream natural language processing task. In a specific language processing task, a phrase granularity feature is corrected by a word granularity feature, and the word granularity feature is expression-enriched by the phrase granularity feature, thereby contributing to improvement of the processing precision of the downstream natural language processing task, and improving the transfer effect of the language representation model.

The language representation model pre-training apparatus according to the embodiment of the present disclosure may perform the language representation model pre-training method according to any embodiment of the present disclosure, and has corresponding functional modules for executing the method and respective beneficial effects.

It is worth noting that the units and modules included in the above-described apparatus are only divided according to functional logic, but not limited to the above-described division, as long as corresponding functions can be implemented. In addition, specific names of the functional units are only intended for distinction from each other, but are not used to limit the protection scope of the embodiments of the present disclosure.

Embodiment 6

FIG. 8 shows a natural language processing apparatus according to Embodiment 6 of the present disclosure. Specifically, the apparatus includes a determining module 810, a segmenting module 820, a fine-tuning module 830 and a processing module 840.

The determining module 810 is configured to determine a fine-tuning sample corpus based on a natural language processing task. The segmenting module 820 is configured to segment the fine-tuning sample corpus in units of phrases to obtain a fine-tuning phrase segmentation result, and segment the fine-tuning sample corpus in units of words to obtain a fine-tuning word segmentation result. The fine-tuning module 830 is configured to fine-tune a pre-trained language representation model by using the fine-tuning phrase segmentation result and the fine-tuning word segmentation result. The processing module 840 is configured to process, with the fine-tuned language representation model, a to-be-processed natural language.

Based on the above-described technical solution, the natural language processing task includes at least one of:

semantic similarity calculation, text classification, language reasoning, keyword recognition, and reading comprehension.

In the technical solution provided in the embodiments of the present disclosure, the mixed-granularity language representation model disclosed in the above embodiments is subject to fine-tuning training in conjunction with a specific processing task, then a natural language task is processed based on the mixed-granularity language representation model after the fine-tuning training, where a phrase granularity feature is corrected by a word granularity feature and the word granularity feature is expression-enriched by the phrase granularity feature, thereby improving the processing precision of the natural language processing task.

The natural language processing apparatus according to the embodiment of the present disclosure may perform the natural language processing method according to any embodiment of the present disclosure, and has corresponding functional modules for executing the method and respective beneficial effects.

It is worth noting that the units and modules included in the above-described apparatus are only divided according to functional logic, but not limited to the above-described division, as long as corresponding functions can be implemented. In addition, specific names of the functional units are only intended for distinction from each other, but are not used to limit the protection scope of the embodiments of the present disclosure.

Embodiment 7

Hereinafter, referring to FIG. 9, a schematic structural diagram of an electronic device 400 (such as a terminal device or a server in FIG. 9) for implementing the embodiments of the present disclosure is shown. The terminal device in the embodiment of the present disclosure may include, but is not limited to: a mobile terminal, such as a mobile phone, a notebook computer, a digital broadcast receiver, a PDA (Personal Digital Assistant), a PAD (a tablet computer), a PMP (Portable Media Player), and a vehicle-mounted terminal (such as vehicle-mounted navigation terminal); and a fixed terminal, such as a digital TV, and a desktop computer. The electronic device shown in FIG. 9 is merely an example, which should not impose any restrictions on functionalities and application scope of the embodiments of the present disclosure.

As shown in FIG. 9, the electronic device 400 may include a processing apparatus (such as a central processor, and a graphics processor) 401, which may perform various appropriate actions and processes according to a program stored in a read only memory (ROM) 402 or a program loaded into a random access memory (RAM) 403 from a storage apparatus 408. In the RAM 403, various programs and data required for operations of the electronic device 400 are also stored. The processing apparatus 401, the ROM 402 and the RAM 403 are connected to each other through a bus 404. An input/output (I/O) interface 405 is also connected to the bus 404.

Generally, the following apparatuses may be connected to the I/O interface 405: an input apparatus 406, including, for example, a touch screen, a touch pad, a keyboard, a mouse, a camera, a microphone, an accelerometer, or a gyroscope; an output apparatus 407, including, for example, a liquid crystal display (LCD), a speaker, or a vibrator; a storage apparatus 408, including, for example, a magnetic tape, or a hard disk; and a communication apparatus 409. The communication apparatus 409 may enable the electronic device 400 to communicate, wirelessly or in a wired communication way, with a further device for data exchange. Although FIG. 9 shows an electronic device 400 with various apparatuses, comprehensibly, there is no such requirement that all the apparatuses shown should be implemented or provided. Alternatively, more or fewer apparatuses may be implemented or provided.

Particularly, according to the embodiments of the present disclosure, the process described above with reference to the flowchart(s) may be implemented as a computer software program. For example, an embodiment of the present disclosure provides a computer program product including a computer program carried on a non-transitory computer-readable medium, where the computer program includes program codes for performing the method shown in the flowchart. In such an embodiment, the computer program may be downloaded and installed from the network through the communication apparatus 409, or installed from the storage apparatus 408 or from the ROM 402. When executed by the processing apparatus 401, the computer program performs the above-described functionalities defined in the method according to the embodiments of the present disclosure.

The terminal device provided in the embodiment of the present disclosure belongs to the same inventive concept as the language representation model pre-training method and the natural language processing method according to the forgoing embodiments. For technical details not detailed in the embodiment of the present disclosure, reference may be made to the forgoing embodiments; moreover, the embodiment of the present disclosure has the same beneficial effects as the forgoing embodiments.

Embodiment 8

An embodiment of the present disclosure provides a non-transitory computer storage medium on which a computer program is stored. The program, when being executed by a processor, causes the language representation model pre-training method and the natural language processing method as described in the foregoing embodiments to be implemented.

It should be noted that the above-described computer-readable medium in the present disclosure may be a computer-readable signal medium or a computer-readable storage medium or any combination thereof. The computer-readable storage medium may be, for example, but not limited to, an electrical, a magnetic, an optical, an electromagnetic, an infrared or a semiconductor system, apparatus or device, or any combination of the above. More specific examples of the computer-readable storage medium may include, but not limited to, an electrically connected portable computer disk with one or more wires, a hard disk, a random access memory (RAM), a read-only memory (ROM), an erasable programmable read-only memory (EPROM; or a flash memory), an optical fiber, a portable compact disk read-only memory (CD-ROM), an optical storage device, a magnetic storage device, or any suitable combination of the above. In the present disclosure, the computer-readable storage medium may be any tangible medium in which a program is contained or stored. The program may be used by or in combination with an instruction execution system, apparatus or device. In the present disclosure, the computer-readable signal medium may include a data signal propagated in a baseband or as a part of a carrier wave, where computer-readable program codes are carried. This propagated data signal may be in various forms, including but not limited to electromagnetic signals, optical signals or any suitable combination of the above. The computer-readable signal medium may also be any computer-readable medium other than the computer-readable storage medium. The computer-readable signal medium may send, propagate or transmit the program for use by or in combination with the instruction execution system, apparatus or device. The program codes contained in the computer-readable medium may be transmitted using any suitable medium, including but not limited to: electric wires, optical cables, RF (radio frequency), etc., or any suitable combination of the above.

In some embodiments, a client and a server can communicate using any currently known or future developed network protocol, such as HTTP (HyperText Transfer Protocol), and may be interconnected to digital data communications (such as a communication network) in any form or medium. Examples of the communication network include a local area network (LAN), a wide area network (WAN), a worldwide web (for example, Internet), an end-to-end network (for example, an ad hoc network), and any currently known or future developed network.

The above-described computer-readable medium may be included in the above-described electronic device; or it may exist alone without being assembled into the electronic device.

The above-described computer-readable medium carries one or more programs which, when being executed by the electronic device, cause the electronic device to:

determine a corpus sample for pre-training, segment the corpus sample in units of phrases to obtain a phrase segmentation result, and segmenting the corpus sample in units of words to obtain a word segmentation result, pre-train, with the phrase segmentation result, a phrase granularity language representation sub-model, that is based on segmentation in units of phrases, of a language representation model, to obtain a pre-trained phrase granularity language representation sub-model, and pre-train, with the word segmentation result, a word granularity language representation sub-model, based on segmentation in units of words, of the language representation model, to obtain a pre-trained word granularity language representation sub-model.

In addition, the one or more programs which, when being executed by the electronic device, further cause enable the electronic device to:

determine a fine-tuning sample corpus based on a natural language processing task;

segment the fine-tuning sample corpus in units of phrases to obtain a fine-tuning phrase segmentation result, and segmenting the fine-tuning sample corpus in units of words to obtain a fine-tuning word segmentation result;

fine-tune a pre-trained language representation model by using the fine-tuning phrase segmentation result and the fine-tuning word segmentation result; and process, by the fine-tuned language representation model, a to-be-processed natural language.

Computer program codes for performing the operations of the present disclosure may be written in one or more programming languages or a combination thereof, including but not limited to: object-oriented programming languages, such as Java, Smalltalk and C++; and conventional procedural programming languages, such as "C" language or similar programming languages. The program codes may be completely executed on a user computer, partially executed on a user computer, executed as an independent software package, partially executed on a user computer and partially executed on a remote computer, or completely executed on a remote computer or a server. In a case involving the remote computer, the remote computer may be connected to a user computer through any kind of networks, including a local area network (LAN) or a wide area network (WAN), or may be connected to an external computer (for example, connecting through Internet with use of an Internet service provider).

The flowcharts and block diagrams in the drawings illustrate architectures, functionalities and operations of possible implementations of the system, the method, the computer program and the computer program product according to various embodiments of the present disclosure. In this regard, each block in the flowcharts or block diagrams may represent a module, a program segment or part of codes, which contains one or more executable instructions for implementing specified logical functionalities. It should also be noted that, in some alternative implementations, the functionalities marked in the blocks may also occur in a different order from that marked in the drawings. For example, two blocks shown in succession may actually be executed in parallel substantially, and sometimes they can be executed in a reverse order, depending on the functionalities involved. It should also be noted that each block in the block diagrams and/or the flowcharts, and a combination of blocks in the block diagrams and/or the flowcharts, may be implemented by a dedicated hardware-based system that performs specified functionalities or operations, or may be implemented by a combination of dedicated hardware and computer instructions.

The units involved in the embodiments described in the present disclosure may be implemented by means of software or hardware. In some cases, unit names do not limit the units. For example, an editable content displaying unit can also be described as an "editing unit". An embodiment of the present disclosure further provides a computer program which, when running on an electronic device or executed by a processor, causes the above-described functions defined in the method according to the embodiments of the present disclosure to be implemented.

The functionalities described above herein may be at least partially performed by one or more hardware logic components. For example, non-restrictively, available hardware logic components that may be used include the following exemplary types: a field programmable gate array (FPGA), an application specific integrated circuit (ASIC), an application specific standard product (ASSP), a system on chip (SOC), a complex programmable logic device (CPLD) and the like.

In the context of the present disclosure, a machine-readable medium may be a tangible medium in which a program for use by or in combination with an instruction execution system, apparatus or device can be contained or stored. The machine-readable medium may be a machine-readable signal medium or a machine-readable storage medium. The machine-readable medium may include, but not limited to, an electronic, a magnetic, an optical, an electromagnetic, an infrared, or a semiconductor system, apparatus or device, or any suitable combination of the foregoing. More specific examples of the machine-readable storage medium may include an electrically connected, portable computer disk based on one or more wires, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the foregoing.

According to one or more embodiments of the present disclosure, Example 1 provides a language representation model system. The system includes: a word granularity language representation sub-model based on segmentation in units of words, and a phrase granularity language representation sub-model based on segmentation in units of phrase, where the word granularity language representation sub-model is configured to output, based on a sentence segmented in units of words, a first semantic vector corresponding to a semantic expressed by each segmented word in the sentence; and the phrase granularity language representation sub-model is configured to output, based on the sentence segmented in units of phrases, a second semantic vector corresponding to a semantic expressed by each segmented phrase in the sentence.

According to one or more embodiments of the present disclosure, Example 2 provides a language representation model system on the basis of Example 1. In an implementation, the word granularity language representation sub-model includes a word granularity input layer, a word granularity coding layer and a word granularity output layer, the word granularity input layer, the word granularity coding layer and the word granularity output layer each being based on the segmentation in units of words;

where the word granularity input layer is connected with the word granularity coding layer, and is configured to: receive the sentence segmented in units of words, convert each segmented word into a corresponding word vector through combining a position of the segmented word in the sentence and a paragraph where the sentence is located, and send the word vector to the word granularity coding layer;

the word granularity coding layer is connected with the word granularity output layer, and is configured to: determine, based on the received word vector, the first semantic vector corresponding to the semantic expressed by each segmented word in the sentence, and output the first semantic vector to the word granularity output layer; and the word granularity output layer is configured to output the received first semantic vector.

According to one or more embodiments of the present disclosure, Example 3 provides a language representation model system on the basis of Example 2. In an implementation, there are at least two word granularity coding layers, and each word granularity coding layer is of a Transformer structure.

According to one or more embodiments of the present disclosure, Example 4 provides a language representation model system on the basis of any of the previous Examples. In an implementation, the phrase granularity language representation sub-model includes a phrase granularity input layer, a phrase granularity coding layer and a phrase granularity output layer, the phrase granularity input layer, the phrase granularity coding layer and the phrase granularity output layer each being based on the segmentation in units of phrases;

where the phrase granularity input layer is connected with the phrase granularity coding layer, and is configured to: receive the sentence segmented in units of phrases, convert each segmented phrase into a corresponding phrase vector through combining a position of the segmented phrase in the sentence and the paragraph where the sentence is located, and send the phrase vector to the phrase granularity coding layer;

the phrase granularity coding layer is connected with the phrase granularity output layer, and is configured to: determine, based on the received phrase vector, the second semantic vector corresponding to the semantic expressed by each segmented phrase in the sentence, and output the second semantic vector to the phrase granularity output layer; and the phrase granularity output layer is configured to output the received second semantic vector.

According to one or more embodiments of the present disclosure, Example 5 provides a language representation model system system on the basis of Example 4. In an implementation, there are at least two phrase granularity coding layers, and each phrase granularity coding layer is of a Transformer structure.

According to one or more embodiments of the present disclosure, Example 6 provides a language representation model pre-training method. The method includes:

determining a corpus sample for pre-training;

segmenting the corpus sample in units of phrases to obtain a phrase segmentation result, and segmenting the corpus sample in units of words to obtain a word segmentation result;

pre-training, with the phrase segmentation result, a phrase granularity language representation sub-model, that is based on segmentation in units of phrases, of a language representation model, to obtain a pre-trained phrase granularity language representation sub-model; and pre-training, with the word segmentation result, a word granularity language representation sub-model, that is based on segmentation in units of words, of the language representation model, to obtain a pre-trained word granularity language representation sub-model.

According to one or more embodiments of the present disclosure, Example 7 provides a language representation model pre-training method on the basis of Example 6. Optionally In an implementation, the pre-training, with the phrase segmentation result, a phrase granularity language representation sub-model, that is based on segmentation in units of phrases, of a language representation model includes:

masking a set proportion of segmented phrases from the phrase segmentation result that is in units of phrases;

inputting the masked segmented phrases and remaining unmasked segmented phrases of the phrase segmentation result to a phrase granularity input layer of the phrase granularity language representation sub-model, to convert, by the phrase granularity input layer, each segmented phrase into a corresponding phrase vector through combining a position of the segmented phrase in a corpus of the corpus sample and a paragraph where the corpus is located, and send, by the phrase granularity input layer, the phrase vector to a phrase granularity coding layer of the phrase granularity language representation sub-model;

determining, by the phrase granularity coding layer, a second semantic vector corresponding to a semantic expressed by each segmented phrase in the corpus, and outputting, by the phrase granularity coding layer, the second semantic vector to a phrase granularity output layer of the phrase granularity language representation sub-model;

outputting, by the phrase granularity output layer, the masked segmented phrases based on the second semantic vectors of individual segmented phrases; and ending the pre-training when an accuracy that the phrase granularity output layer outputs the masked segmented phrases reaches a second threshold.

According to one or more embodiments of the present disclosure, Example 8 provides a language representation model pre-training method on the basis of Example 7. In an implementation, the pre-training, with the word segmentation result, a word granularity language representation sub-model, that is based on segmentation in units of words, of the language representation model includes:

masking a set proportion of segmented words from the word segmentation result that is in units of words;

inputting the masked segmented words and remaining unmasked segmented words of the word segmentation result to a word granularity input layer of the word granularity language representation sub-model, to convert, by the word granularity input layer, each segmented word into a corresponding word vector through combining a position of the segmented word in the corpus of the corpus sample and the paragraph where the corpus is located, and send, by the word granularity input layer, the word vector to a word granularity coding layer of the word granularity language representation sub-model;

determining, by the word granularity coding layer, a first semantic vector corresponding to a semantic expressed by each segmented word in the corpus, and outputting, by the word granularity coding layer, the first semantic vector to a word granularity output layer of the word granularity language representation sub-model;

outputting, by the word granularity output layer, the masked segmented words based on the first semantic vectors of individual segmented words; and ending the pre-training when an accuracy that the word granularity output layer outputs the masked segmented words reaches a first threshold.

According to one or more embodiments of the present disclosure, Example 9 provides a language representation model pre-training method on the basis of Example 8. In an implementation, there are at least two word granularity coding layers, and each word granularity coding layer is of a Transformer structure; and there are at least two phrase granularity coding layers, and each phrase granularity coding layer is of a Transformer structure.

According to one or more embodiments of the present disclosure, Example 10 provides a language representation model pre-training method on the basis of Example 9. In an implementation, the language representation model includes the following parameters: a word vector parameter corresponding to the word granularity language representation sub-model; a phrase vector parameter corresponding to the phrase granularity language representation sub-model; and a Transformer association parameter, a position vector and a paragraph vector that are shared by the word granularity language representation sub-model and the phrase granularity language representation sub-model.

According to one or more embodiments of the present disclosure, Example 11 provides a natural language processing method. The method includes:

determining a fine-tuning sample corpus based on a natural language processing task;

segmenting the fine-tuning sample corpus in units of phrases to obtain a fine-tuning phrase segmentation result, and segmenting the fine-tuning sample corpus in units of words to obtain a fine-tuning word segmentation result;

fine-tuning a pre-trained language representation model, by using the fine-tuning phrase segmentation result and the fine-tuning word segmentation result; and processing, by the fine-tuned language representation model, a to-be-processed natural language.

According to one or more embodiments of the present disclosure, Example 12 provides a natural language processing method on the basis of Example 11. In an implementation, the natural language processing task includes at least one of: semantic similarity calculation, text classification, language reasoning, keyword recognition, and reading comprehension.

According to one or more embodiments of the present disclosure, Example 13 provides a language representation model pre-training apparatus. The apparatus includes:

a determining module, configured to determine a corpus sample for pre-training;

a segmenting module, configured to segment the corpus sample in units of phrases to obtain a phrase segmentation result, and segment the corpus sample in units of words to obtain a word segmentation result;

a first pre-training module, configured to pre-train, with the phrase segmentation result, a phrase granularity language representation sub-model, that is based on segmentation in units of phrases, of a language representation model, to obtain a pre-trained phrase granularity language representation sub-model; and a second pre-training module, configured to pre-train, with the word segmentation result, a word granularity language representation sub-model, that is based on segmentation in units of words, of the language representation model, to obtain a pre-trained word granularity language representation sub-model.

According to one or more embodiments of the present disclosure, Example 14 provides a natural language processing apparatus. The apparatus includes:

a determining module, configured to determine a fine-tuning sample corpus based on a natural language processing task;

a segmenting module, configured to segment the fine-tuning sample corpus in units of phrases to obtain a fine-tuning phrase segmentation result, and segment the fine-tuning sample corpus in units of words to obtain a fine-tuning word segmentation result;

a fine-tuning module, configured to fine-tune a pre-trained language representation model, by using the fine-tuning phrase segmentation result and the fine-tuning word segmentation result; and a processing module, configured to process, by the fine-tuned language representation model, a to-be-processed natural language.

According to one or more embodiments of the present disclosure, Example 15 provides an electronic device. The electronic device includes:

one or more processors; and a storage apparatus, configured to store one or more programs, where the one or more programs, when being executed by the one or more processors, cause the one or more processors to implement the language representation model pre-training method including:

determining a corpus sample for pre-training;

segmenting the corpus sample in units of phrases to obtain a phrase segmentation result, and segmenting the corpus sample in units of words to obtain a word segmentation result;

pre-training, with the phrase segmentation result, a phrase granularity language representation sub-model, that is based on segmentation in units of phrases, of a language representation model, to obtain a pre-trained phrase granularity language representation sub-model; and pre-training, with the word segmentation result, a word granularity language representation sub-model, that is based on segmentation in units of words, of the language representation model, to obtain a pre-trained word granularity language representation sub-model;

and to implement the nature language processing method including:

determining a fine-tuning sample corpus based on a natural language processing task;

segmenting the fine-tuning sample corpus in units of phrases to obtain a fine-tuning phrase segmentation result, and segmenting the fine-tuning sample corpus in units of words to obtain a fine-tuning word segmentation result;

fine-tuning a pre-trained language representation model, by using the fine-tuning phrase segmentation result and the fine-tuning word segmentation result; and processing, by the fine-tuned language representation model, a to-be-processed natural language.

According to one or more embodiments of the present disclosure, Example 16 provides a storage medium containing computer-executable instructions, where the computer-executable instructions, when being executed by a computer processor, cause a language representation model pre-training method to be implemented, the method including:

determining a corpus sample for pre-training;

segmenting the corpus sample in units of phrases to obtain a phrase segmentation result, and segmenting the corpus sample in units of words to obtain a word segmentation result;

pre-training, with the phrase segmentation result, a phrase granularity language representation sub-model, that is based on segmentation in units of phrases, of a language representation model, to obtain a pre-trained phrase granularity language representation sub-model; and pre-training, with the word segmentation result, a word granularity language representation sub-model, that is based on segmentation in units of words, of the language representation model, to obtain a pre-trained word granularity language representation sub-model;

and cause a nature language processing method to be implemented, the method including:

determining a fine-tuning sample corpus based on a natural language processing task;

segmenting the fine-tuning sample corpus in units of phrases to obtain a fine-tuning phrase segmentation result, and segmenting the fine-tuning sample corpus in units of words to obtain a fine-tuning word segmentation result;

fine-tuning a pre-trained language representation model, by using the fine-tuning phrase segmentation result and the fine-tuning word segmentation result; and processing, by the fine-tuned language representation model, a to-be-processed natural language.

The above descriptions are only preferred embodiments of the present disclosure and illustrations of the applied technical principles. Those skilled in the art should understand that the scope involved in the present disclosure is not limited to the technical schemes formed from a specific combination of the above-described technical features, but covers other technical schemes formed from any combination of the above-described technical features or their equivalent features without departing from the above disclosed concept, such as a technical scheme formed from replacement of the above-described features with technical features having similar functionalities to those disclosed in (but not limited to) the present disclosure.

Furthermore, although the operations are depicted in a particular order, this does not mean a requirement that these operations should be performed in the particular order shown or in a sequential order. Under certain circumstances, multitasking and parallel processing may be beneficial. Similarly, although the above discussion contains several specific implementation details, these should not be interpreted as limitations on the scope of the present disclosure. Some features described in the context of separate embodiments also may be implemented in a single embodiment in combination. On the contrary, various features described in the context of a single embodiment also may be implemented in multiple embodiments separately or in any suitable sub-combinations.

Although the subject matters have been described in language specific to structural features and/or methodological logical actions, it will be appreciated that the subject matter defined in the appended claims is not necessarily limited to the specific features or actions described above. On the contrary, the specific features and actions described above are only exemplary forms for implementing the claims.

The invention claimed is:

1. A natural language processing method, wherein the method is executed by an electronic device and applied in a natural language processing task, and the method comprises:

determining a corpus sample for pre-training;

segmenting the corpus sample in units of phrases to obtain a phrase segmentation result, and segmenting the corpus sample in units of words to obtain a word segmentation result;

pre-training, with the phrase segmentation result, a phrase granularity language representation sub-model, that is based on segmentation in units of phrases, of a language representation model, to obtain a pre-trained phrase granularity language representation sub-model;

pre-training, with the word segmentation result, a word granularity language representation sub-model, that is based on segmentation in units of words, of the language representation model, to obtain a pre-trained word granularity language representation sub-model; and performing the natural language processing task based on a pre-trained language representation model, wherein the pre-trained language representation model comprises the pre-trained phrase granularity language representation sub-model and the pre-trained word granularity language representation sub-model, wherein the pre-training, with the word segmentation result, a word granularity language representation sub-model, that is based on segmentation in units of words, of the language representation model comprises:

masking a set proportion of segmented words from the word segmentation result that is in units of words;

inputting the masked segmented words and remaining unmasked segmented words of the word segmentation result to a word granularity input layer of the word granularity language representation sub-model;

converting, by the word granularity input layer, each segmented word into a corresponding word vector through combining a position of the segmented word in a corpus of the corpus sample and a paragraph where the corpus is located, and sending, by the word granularity input layer, the word vector to a word granularity coding layer of the word granularity language representation sub-model;

determining, by the word granularity coding layer, a first semantic vector corresponding to a semantic expressed by each segmented word in the corpus, and outputting, by the word granularity coding layer, the first semantic vector to a word granularity output layer of the word granularity language representation sub-model;

outputting, by the word granularity output layer, the masked segmented words based on the first semantic vectors of individual segmented words; and ending the pre-training when an accuracy that the word granularity output layer outputs the masked segmented words reaches a first threshold.

2. The method according to claim 1, wherein the pre-training, with the phrase segmentation result, a phrase granularity language representation sub-model, that is based on segmentation in units of phrases, of a language representation model comprises:

masking a set proportion of segmented phrases from the phrase segmentation result that is in units of phrases;

inputting the masked segmented phrases and remaining unmasked segmented phrases of the phrase segmentation result to a phrase granularity input layer of the phrase granularity language representation sub-model;

converting, by the phrase granularity input layer, each segmented phrase into a corresponding phrase vector through combining a position of the segmented phrase in the corpus of the corpus sample and the paragraph where the corpus is located, and sending, by the phrase granularity input layer, the phrase vector to a phrase granularity coding layer of the phrase granularity language representation sub-model;

determining, by the phrase granularity coding layer, a second semantic vector corresponding to a semantic expressed by each segmented phrase in the corpus, and outputting, by the phrase granularity coding layer, the second semantic vector to a phrase granularity output layer of the phrase granularity language representation sub-model;

outputting, by the phrase granularity output layer, the masked segmented phrases based on the second semantic vectors of individual segmented phrases; and ending the pre-training when an accuracy that the phrase granularity output layer outputs the masked segmented phrases reaches a second threshold.

3. The method according to claim 2, wherein there are at least two word granularity coding layers, and each word granularity coding layer is of a Transformer structure; and there are at least two phrase granularity coding layers, and each phrase granularity coding layer is of a Transformer structure.

4. The method according to claim 3, wherein the language representation model comprises the following parameters: a word vector parameter corresponding to the word granularity language representation sub-model; a phrase vector parameter corresponding to the phrase granularity language representation sub-model; and a Transformer association parameter, a position vector and a paragraph vector that are shared by the word granularity language representation sub-model and the phrase granularity language representation sub-model.

5. The method according to claim 2, wherein the outputting, by the phrase granularity output layer, the masked segmented phrases based on the second semantic vectors of individual segmented phrases comprises:

predicting, by the phrase granularity output layer, each masked segmented phrase, based on a position identifier and a paragraph identifier of the masked segmented phrase, and in combination with semantics of a previous segmented phrase and a next segmented phrase of the masked segmented phrase.

6. The method according to claim 1, wherein the performing the natural language processing task based on a pre-trained language representation model comprises:

determining a fine-tuning sample corpus based on the natural language processing task;

segmenting the fine-tuning sample corpus in units of phrases to obtain a fine-tuning phrase segmentation result, and segmenting the fine-tuning sample corpus in units of words to obtain a fine-tuning word segmentation result;

fine-tuning the pre-trained language representation model, by using the fine-tuning phrase segmentation result and the fine-tuning word segmentation result; and processing, by the fine-tuned language representation model, a to-be-processed natural language.

7. The method according to claim 6, wherein the natural language processing task comprises at least one of: semantic similarity calculation, text classification, language reasoning, Chinese co-reference resolution, keyword recognition, and reading comprehension.

8. An electronic device, comprising:

one or more processors; and a storage apparatus, configured to store one or more programs, wherein the one or more programs, when being executed by the one or more processors, cause the one or more processors to:

determine a corpus sample for pre-training;

segment the corpus sample in units of phrases to obtain a phrase segmentation result, and segment the corpus sample in units of words to obtain a word segmentation result;

pre-train, with the phrase segmentation result, a phrase granularity language representation sub-model, that is based on segmentation in units of phrases, of a language representation model, to obtain a pre-trained phrase granularity language representation sub-model;

pre-train, with the word segmentation result, a word granularity language representation sub-model, that is based on segmentation in units of words, of the language representation model, to obtain a pre-trained word granularity language representation sub-model;

perform a natural language processing task based on a pre-trained language representation model, wherein the pre-trained language representation model comprises the pre-trained phrase granularity language representation sub-model and the pre-trained word granularity language representation sub-model;

mask a set proportion of segmented words from the word segmentation result that is in units of words;

input the masked segmented words and remaining unmasked segmented words of the word segmentation result to a word granularity input layer of the word granularity language representation sub-model;

convert, by the word granularity input layer, each segmented word into a corresponding word vector through combining a position of the segmented word in a corpus of the corpus sample and a paragraph where the corpus is located, and send, by the word granularity input layer, the word vector to a word granularity coding layer of the word granularity language representation sub-model;

determine, by the word granularity coding layer, a first semantic vector corresponding to a semantic expressed by each segmented word in the corpus, and output, by the word granularity coding layer, the first semantic vector to a word granularity output layer of the word granularity language representation sub-model;

output, by the word granularity output layer, the masked segmented words based on the first semantic vectors of individual segmented words; and end the pre-training when an accuracy that the word granularity output layer outputs the masked segmented words reaches a first threshold.

9. The electronic device according to claim 8, wherein the one or more programs, when being executed by the one or more processors, further cause the one or more processors to:

mask a set proportion of segmented phrases from the phrase segmentation result that is in units of phrases;

input the masked segmented phrases and remaining unmasked segmented phrases of the phrase segmentation result to a phrase granularity input layer of the phrase granularity language representation sub-model;

convert, by the phrase granularity input layer, each segmented phrase into a corresponding phrase vector through combining a position of the segmented phrase in the corpus of the corpus sample and the paragraph where the corpus is located, and send, by the phrase granularity input layer, the phrase vector to a phrase granularity coding layer of the phrase granularity language representation sub-model;

determine, by the phrase granularity coding layer, a second semantic vector corresponding to a semantic expressed by each segmented phrase in the corpus, and output, by the phrase granularity coding layer, the second semantic vector to a phrase granularity output layer of the phrase granularity language representation sub-model;

output, by the phrase granularity output layer, the masked segmented phrases based on the second semantic vectors of individual segmented phrases; and end the pre-training when an accuracy that the phrase granularity output layer outputs the masked segmented phrases reaches a second threshold.

10. The electronic device according to claim 9, wherein the one or more programs, when being executed by the one or more processors, further cause the one or more processors to:

predict, by the phrase granularity output layer, each masked segmented phrase, based on a position identifier and a paragraph identifier of the masked segmented phrase, and in combination with semantics of a previous segmented phrase and a next segmented phrase of the masked segmented phrase.

11. The electronic device according to claim 8, wherein the one or more programs, when being executed by the one or more processors, further cause the one or more processors to:

determine a fine-tuning sample corpus based on the natural language processing task;

segment the fine-tuning sample corpus in units of phrases to obtain a fine-tuning phrase segmentation result, and segment the fine-tuning sample corpus in units of words to obtain a fine-tuning word segmentation result;

fine-tune the pre-trained language representation model, by using the fine-tuning phrase segmentation result and the fine-tuning word segmentation result; and process, by the fine-tuned language representation model, a to-be-processed natural language.

12. The electronic device according to claim 11, wherein the natural language processing task comprises at least one of: semantic similarity calculation, text classification, language reasoning, Chinese co-reference resolution, keyword recognition, and reading comprehension.

13. A non-transitory storage medium containing computer-executable instructions, wherein the computer-executable instructions, when being executed by a computer processor, cause the computer processor to:

determine a corpus sample for pre-training;

segment the corpus sample in units of phrases to obtain a phrase segmentation result, and segment the corpus sample in units of words to obtain a word segmentation result;

pre-train, with the phrase segmentation result, a phrase granularity language representation sub-model, that is based on segmentation in units of phrases, of a language representation model, to obtain a pre-trained phrase granularity language representation sub-model;

pre-train, with the word segmentation result, a word granularity language representation sub-model, that is based on segmentation in units of words, of the language representation model, to obtain a pre-trained word granularity language representation sub-model;

perform a natural language processing task based on a pre-trained language representation model, wherein the pre-trained language representation model comprises the pre-trained phrase granularity language representation sub-model and the pre-trained word granularity language representation sub-model;

mask a set proportion of segmented words from the word segmentation result that is in units of words;

input the masked segmented words and remaining unmasked segmented words of the word segmentation result to a word granularity input layer of the word granularity language representation sub-model;

convert, by the word granularity input layer, each segmented word into a corresponding word vector through combining a position of the segmented word in a corpus of the corpus sample and a paragraph where the corpus is located, and send, by the word granularity input layer, the word vector to a word granularity coding layer of the word granularity language representation sub-model;

determine, by the word granularity coding layer, a first semantic vector corresponding to a semantic expressed by each segmented word in the corpus, and output, by the word granularity coding layer, the first semantic vector to a word granularity output layer of the word granularity language representation sub-model;

output, by the word granularity output layer, the masked segmented words based on the first semantic vectors of individual segmented words; and end the pre-training when an accuracy that the word granularity output layer outputs the masked segmented words reaches a first threshold.

14. The electronic device according to claim 9, wherein there are at least two word granularity coding layers, and each word granularity coding layer is of a Transformer structure; and there are at least two phrase granularity coding layers, and each phrase granularity coding layer is of a Transformer structure.

15. The electronic device according to claim 14, wherein the language representation model comprises the following parameters: a word vector parameter corresponding to the word granularity language representation sub-model; a phrase vector parameter corresponding to the phrase granularity language representation sub-model; and a Transformer association parameter, a position vector and a paragraph vector that are shared by the word granularity language representation sub-model and the phrase granularity language representation sub-model.

16. The non-transitory storage medium according to claim 13, wherein the computer-executable instructions, when being executed by the computer processor, further cause the computer processor to mask a set proportion of segmented phrases from the phrase segmentation result that is in units of phrases;

input the masked segmented phrases and remaining unmasked segmented phrases of the phrase segmentation result to a phrase granularity input layer of the phrase granularity language representation sub-model;

convert, by the phrase granularity input layer, each segmented phrase into a corresponding phrase vector through combining a position of the segmented phrase in the corpus of the corpus sample and the paragraph where the corpus is located, and send, by the phrase granularity input layer, the phrase vector to a phrase granularity coding layer of the phrase granularity language representation sub-model;

determine, by the phrase granularity coding layer, a second semantic vector corresponding to a semantic expressed by each segmented phrase in the corpus, and output, by the phrase granularity coding layer, the second semantic vector to a phrase granularity output layer of the phrase granularity language representation sub-model;

output, by the phrase granularity output layer, the masked segmented phrases based on the second semantic vectors of individual segmented phrases; and end the pre-training when an accuracy that the phrase granularity output layer outputs the masked segmented phrases reaches a second threshold.

17. The non-transitory storage medium according to claim 16, wherein there are at least two word granularity coding layers, and each word granularity coding layer is of a Transformer structure; and there are at least two phrase granularity coding layers, and each phrase granularity coding layer is of a Transformer structure.

18. The non-transitory storage medium according to claim 17, wherein the language representation model comprises the following parameters: a word vector parameter corresponding to the word granularity language representation sub-model; a phrase vector parameter corresponding to the phrase granularity language representation sub-model; and a Transformer association parameter, a position vector and a paragraph vector that are shared by the word granularity language representation sub-model and the phrase granularity language representation sub-model.

19. The non-transitory storage medium according to claim 16, wherein the computer-executable instructions, when being executed by the computer processor, further cause the computer processor to:

predict, by the phrase granularity output layer, each masked segmented phrase, based on a position identifier and a paragraph identifier of the masked segmented phrase, and in combination with semantics of a previous segmented phrase and a next segmented phrase of the masked segmented phrase.

20. The non-transitory storage medium according to claim 13, wherein the computer-executable instructions, when being executed by the computer processor, further cause the computer processor to:

determine a fine-tuning sample corpus based on the natural language processing task;

segment the fine-tuning sample corpus in units of phrases to obtain a fine-tuning phrase segmentation result, and segment the fine-tuning sample corpus in units of words to obtain a fine-tuning word segmentation result;

fine-tune the pre-trained language representation model, by using the fine-tuning phrase segmentation result and the fine-tuning word segmentation result; and process, by the fine-tuned language representation model, a to-be-processed natural language.

\* \* \* \* \*